US012357148B2

(12) United States Patent
Dabal

(10) Patent No.: US 12,357,148 B2
(45) Date of Patent: Jul. 15, 2025

(54) LATCH ON TUB

(71) Applicant: Whirlpool Corporation, Benton Harbor, MI (US)

(72) Inventor: Michal Janusz Dabal, Pruszowice (PL)

(73) Assignee: Whirlpool Corporation, Benton Harbor, MI (US)

( * ) Notice: Subject to any disclaimer, the term of this patent is extended or adjusted under 35 U.S.C. 154(b) by 293 days.

(21) Appl. No.: 18/131,150

(22) Filed: Apr. 5, 2023

(65) Prior Publication Data

US 2024/0335086 A1 Oct. 10, 2024

(51) Int. Cl.

| | |
|---|---|
| ***A47L 15/42*** | (2006.01) |
| ***A47L 15/00*** | (2006.01) |
| ***E05B 57/00*** | (2006.01) |
| ***E05B 65/00*** | (2006.01) |

(52) U.S. Cl.

CPC ....... *A47L 15/4259* (2013.01); *A47L 15/0049* (2013.01); *E05B 57/00* (2013.01); *E05B 65/00* (2013.01)

(58) Field of Classification Search

None

See application file for complete search history.

(56) References Cited

U.S. PATENT DOCUMENTS

| | | | | |
|---|---|---|---|---|
| 9,687,134 | B2 | 6/2017 | Baldwin et al. | |
| 10,111,575 | B2 | 10/2018 | Torrentes et al. | |
| 2019/0178015 | A1 | 6/2019 | Wang | |
| 2022/0298829 | A1 * | 9/2022 | Roatis ....................... | E05C 3/24 |

FOREIGN PATENT DOCUMENTS

| | | | |
|---|---|---|---|
| CN | 107849782 | A | 3/2018 |
| CN | 106868788 | B | 5/2019 |
| CN | 111691151 | A | 9/2020 |
| EP | 2289387 | B1 | 11/2013 |
| JP | 6359706 | B2 | 7/2018 |
| KR | 20040023111 | A | 3/2004 |
| KR | 101054144 | B1 | 8/2011 |
| WO | 2018233576 | A1 | 12/2018 |

* cited by examiner

*Primary Examiner* — Rita P Adhlakha
(74) *Attorney, Agent, or Firm* — Price Heneveld LLP

(57) ABSTRACT

A washer appliance includes a body that extends vertically between a top surface and a bottom surface and a front face that defines an opening into an internal chamber. A door is mounted to the body and is selectively moveable relative to the front face between an open position and a closed position. A locking assembly retains the door in the closed position. The locking assembly includes a striker and a latch. The striker is connected to the door and includes an interface portion that extends in the vertical direction. The latch is pivotally connected to the body proximate the front face at a first pivot joint and extends from the first pivot joint to a notch. The latch is moveable between a locked position where the interface portion is located in the notch and an unlocked position where the interface portion is located outside of the notch.

20 Claims, 4 Drawing Sheets

LATCH ON TUB

BACKGROUND OF THE DISCLOSURE

The present disclosure generally relates to a locking assembly and, more specifically, to a locking assembly for a washer appliance.

SUMMARY OF THE DISCLOSURE

According to one aspect of the present disclosure, a washer appliance includes a body that extends in a vertical direction between a top surface and a bottom surface and a front face that defines an opening into an internal chamber. A door is mounted to the body and is selectively moveable relative to the front face between an open position and a closed position. A locking assembly retains the door in the closed position. The locking assembly includes a striker and a latch. The striker is connected to the door and includes an interface portion that extends in the vertical direction. The latch is pivotally connected to the body proximate the front face at a first pivot joint and extends from the first pivot joint to a notch. The latch is moveable between a locked position where the interface portion is located in the notch and an unlocked position where the interface portion is located outside of the notch.

According to another aspect of the present disclosure, a washer appliance includes a body that has a front face defining an opening into an internal chamber. An upper duct defines a top edge of the front face and the front face defines an aperture into the upper duct. A door is mounted to the body and is selectively moveable relative to the front face between an open position and a closed position. A locking assembly retains the door in the closed position. The locking assembly includes a striker and a latch. The striker is connected to the door and includes a catch defining an interface portion located in the aperture in the front face when the door is in the closed position. The latch is pivotally connected to the body within the upper duct at a first pivot joint and extends from the first pivot joint to a notch. The latch is moveable between a locked position where the interface portion is located in the notch and an unlocked position where the interface portion is located outside of the notch.

According to yet another aspect of the present disclosure, a dishwasher appliance includes a body extending in a vertical direction between a top surface and a bottom surface and a front face defines an opening into an internal chamber. A door is mounted to the body and is selectively moveable relative to the front face between an open position and a closed position. A locking assembly retains the door in the closed position. The locking assembly includes a striker and a latch. The striker is connected to the door and includes an interface portion extending in the vertical direction. The latch includes a linkage portion that is pivotally connected to the body proximate the front face at a first pivot joint and a head portion defines a notch and is pivotally connected to the linkage portion at a second pivot joint. The latch is moveable between a locked position where the interface portion is located in the notch and an unlocked position where the interface portion is located outside of the notch.

These and other features, advantages, and objects of the present disclosure will be further understood and appreciated by those skilled in the art by reference to the following specification, claims, and appended drawings.

Figure 1:
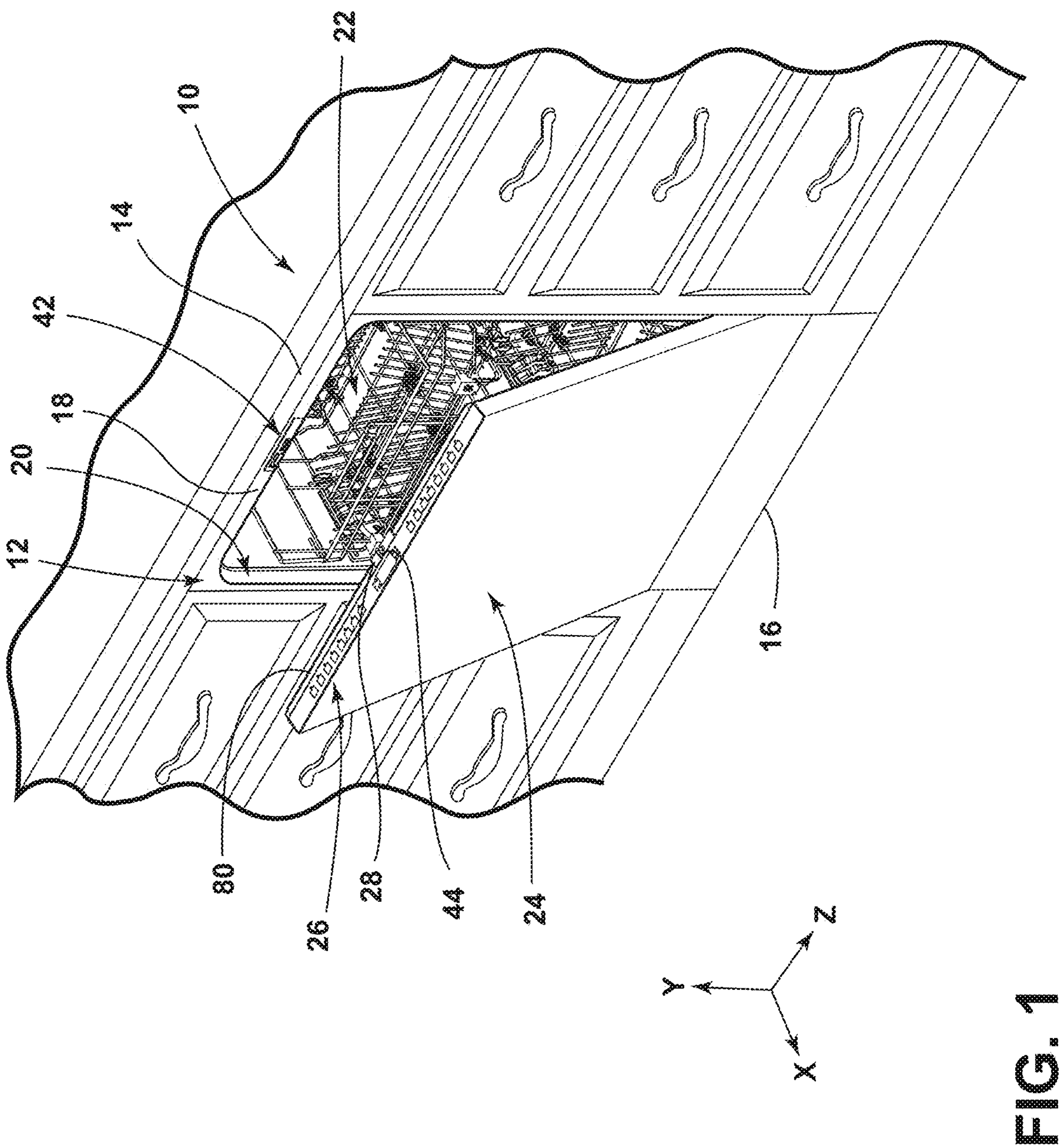
FIG. 1 is a is an upper perspective view of a dishwasher appliance located in a kitchen with a door partially opened in accordance with an aspect of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a locking assembly for a washer appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
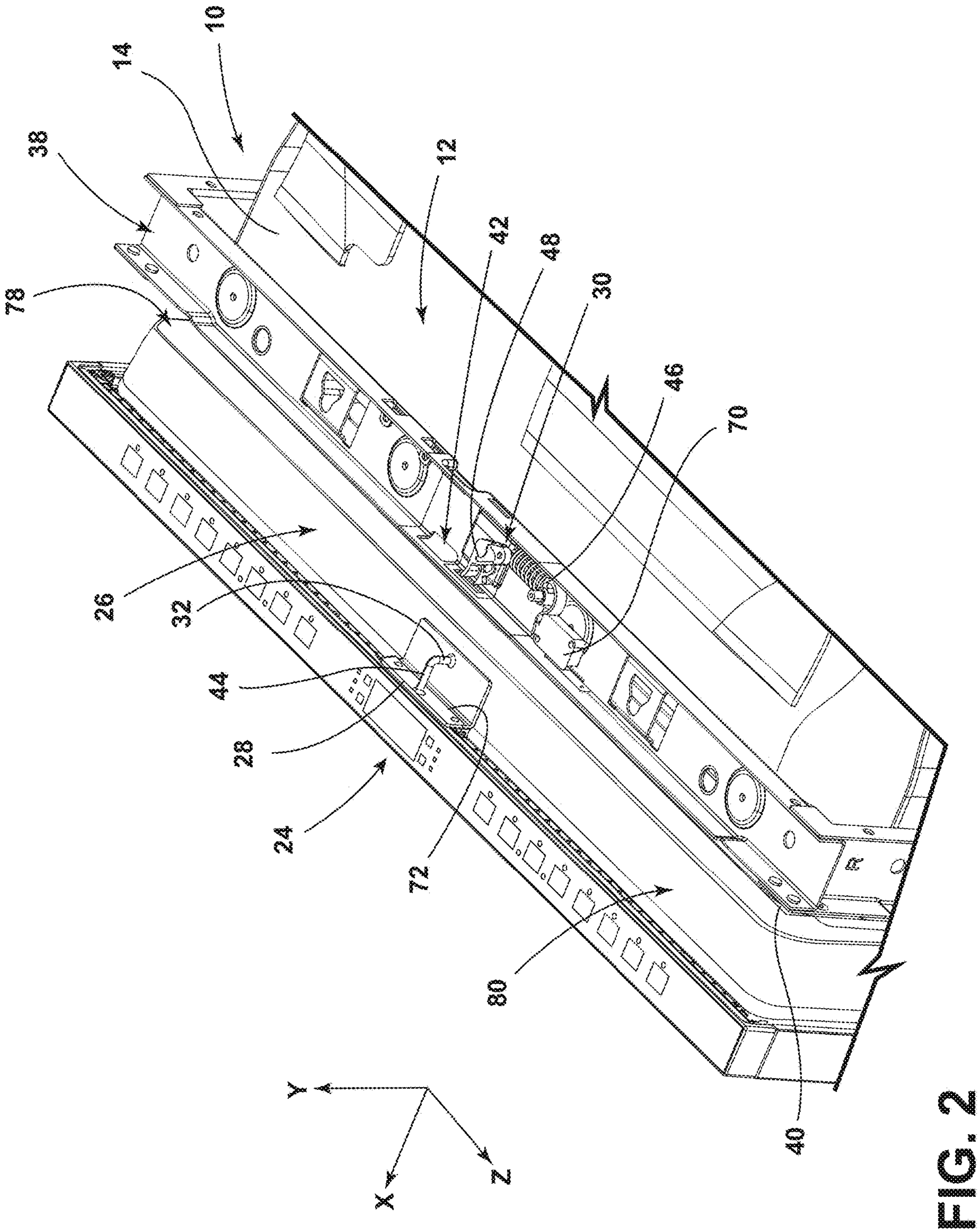
FIG. 2 is an upper perspective view of a dishwasher appliance isolated from an environment with a door partially opened in accordance with an aspect of the present disclosure.
Figure 3:
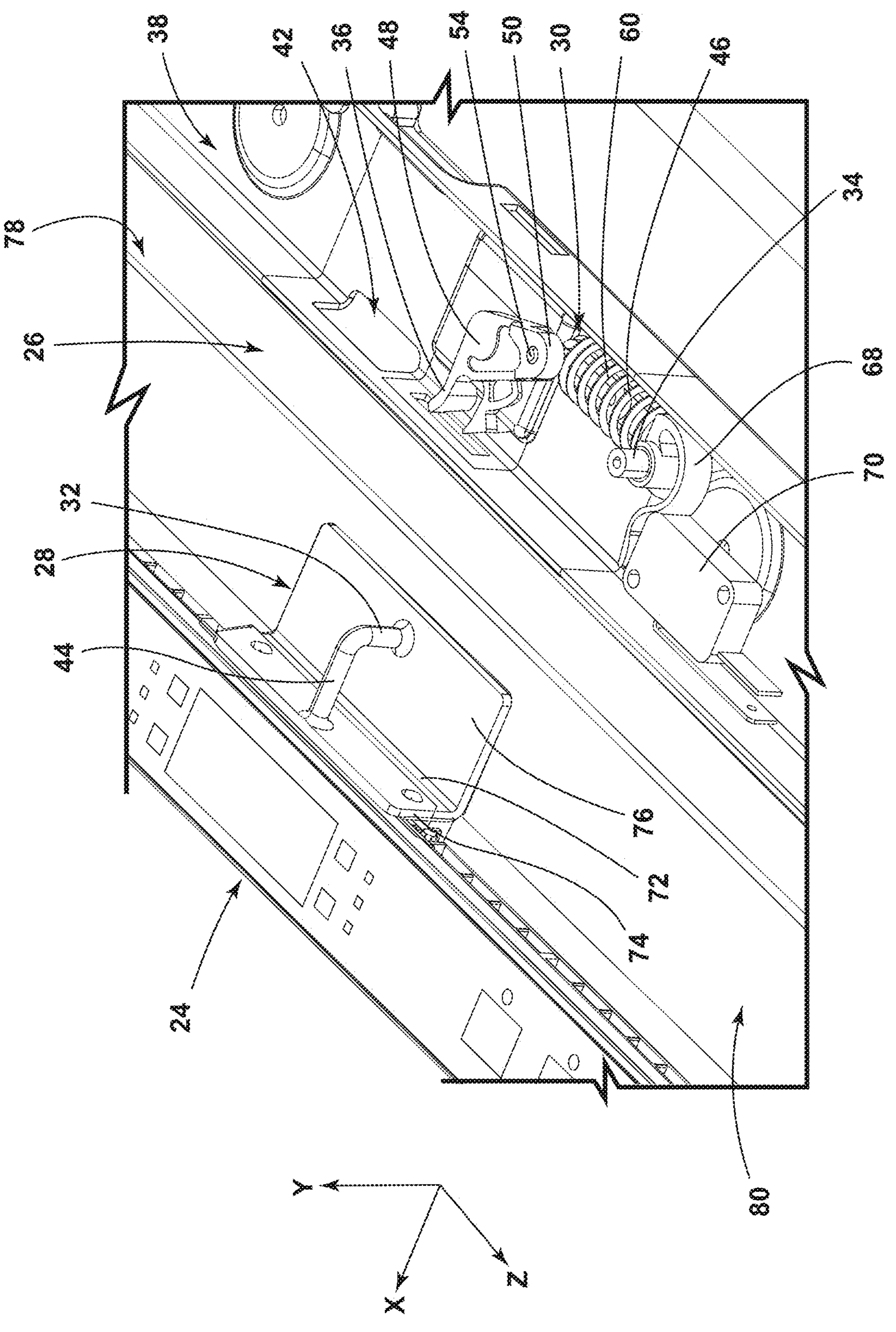
FIG. 3 is an enlarged upper perspective view of a dishwasher appliance isolated from an environment with a locking assembly in accordance with an aspect of the present disclosure.
Figure 4:
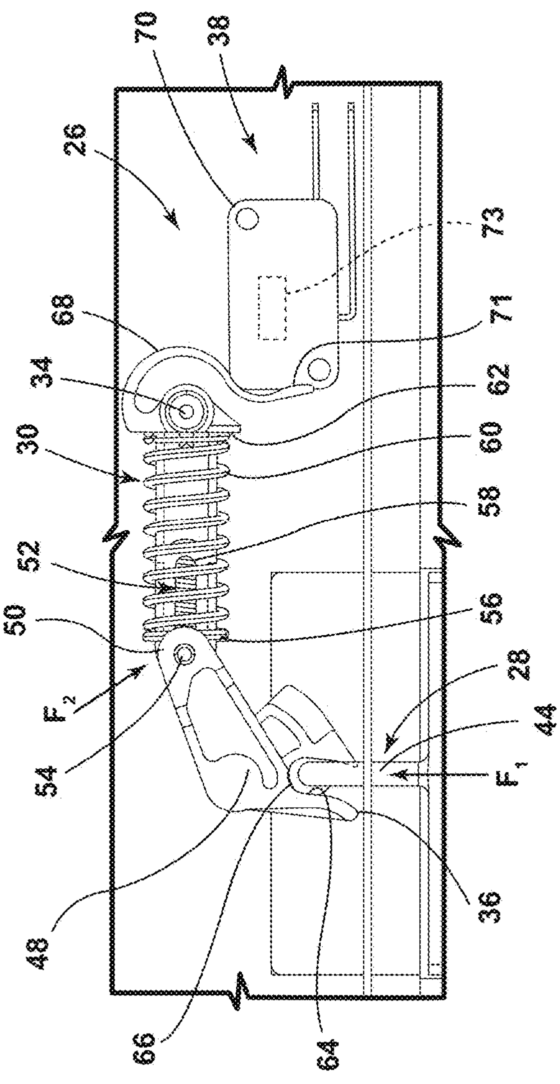
FIG. 4 is a top view of a dishwasher appliance with a locking assembly in a locked position in accordance with an aspect of the present disclosure.
Figure 5:
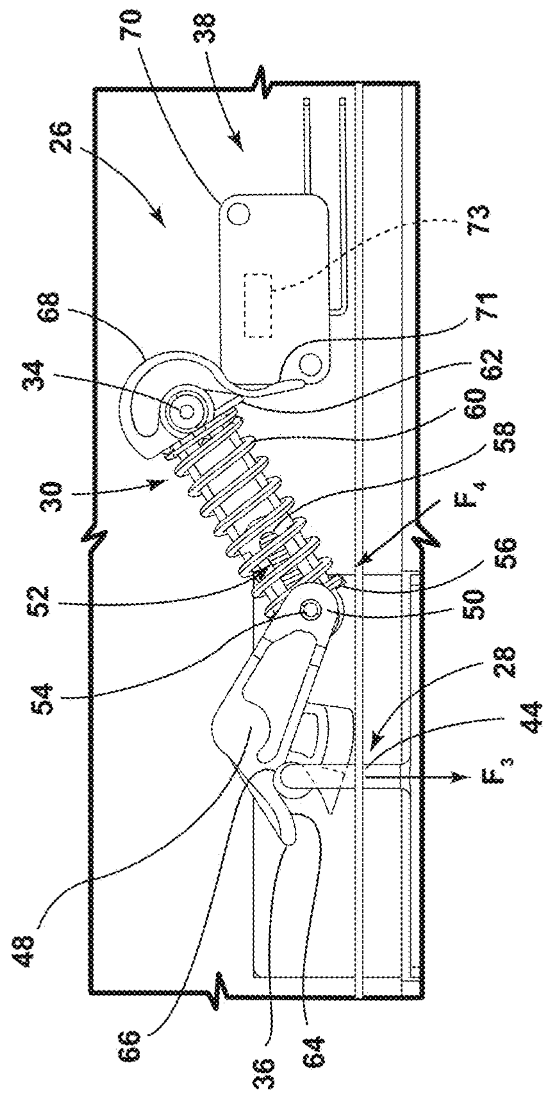
FIG. 5 is a top view of a dishwasher appliance with a locking assembly in an unlocked position in accordance with an aspect of the present disclosure.

Referring to FIGS. 1-5, reference numeral 10 generally designates a washer appliance. The washer appliance 10 may include a body 12 that extends in a vertical direction Y between a top surface 14 and a bottom surface 16 and a front face 18 that defines an opening 20 into an internal chamber 22. A door 24 may be mounted to the body 12 and may be selectively moveable relative to the front face 18 between an open position and a closed position. A locking assembly 26 retains the door 24 in the closed position. The locking assembly 26 may include a striker 28 and a latch 30 (FIGS. 2-5). The striker 28 may be connected to the door 24 and may include an interface portion 32 that extends in the vertical direction Y. The latch 30 may be pivotally connected to the body 12 proximate the front face 18 at a first pivot joint 34 and extends from the first pivot joint 34 to a notch 36 (FIGS. 3-5). The latch 30 may be moveable between a locked position where the interface portion 32 may be located in the notch 36 and an unlocked position where interface portion 32 may be located outside of the notch 36.

With continued reference to FIGS. 1-5, the washer appliance may be a dishwasher. The body 12 may rest on a horizontal plane along the X and Z axes while the vertical direction Y extends along the Y axis. In this manner, the interface portion 32 extends along the Y axis. As such, the latch 30 may be configured to generally rest on the horizontal plane along the X and Z axes and the notch 36 may open along the vertical axis Y. Such an arrangement provides packaging flexibility of the latch 30 with a low profile along the vertical axis Y because the first pivot joint 34 likewise extends along the vertical axis Y. The latch 30 can be located on an upper surface of the body 12 and not interfere with a surrounding environment, such as countertops within a kitchen.

With reference now to FIGS. 2-3, in some embodiments, the dishwasher appliance 10 may include an upper duct 38 that defines a top edge 40 of the front face 18. The front face 18 may define an aperture 42 into the upper duct 38. The striker 28 is connected to the door 24 and may include a catch 44 defining an interface portion 32. The interface portion 32 is aligned with the aperture 42 such that it enters the aperture 42 when the door 24 is articulated to the closed position. The latch 30 may be located in the upper duct 38. For example, the latch 30 may be pivotally connected to the body 12 within the upper duct 38 at the first pivot joint 34.

With reference now to FIGS. 3-5, the latch 30 may include a linkage portion 46 and a head portion 48. In some embodiments, the notch 36 is located in the head portion 48. The linkage portion 46 may be pivotally connected to the head portion 48 at a second pivot joint 50. In this manner, the linkage portion 46 may be pivotally connected to the body 12 within the upper duct 38 at the first pivot joint 34 and the head portion 48 may be pivotally connected to the head portion 48 at the second pivot joint 50. The second pivot joint 50 may not be connected to the body 12 such that it effectively floats during articulation. The linkage portion 46 and the head portion 48 may be both located in the upper duct 38. The linkage portion 46 may define an elongated slot 52 and the head portion 48 may define a pin 54 that is pivotal and slidable within the elongated slot 52 at the second pivot joint 50. The elongated slot 52 extends between a first end 56 that may be closest to the head portion 48 and a second end 58 that may be furthest from the head portion 48 and closer to the first pivot joint 34. A spring 60 may be connected to the linkage portion 46 and biases the pin 54 in the first end 56 of the elongated slot 52. The spring 60 may be helically wound around the linkage portion 46 and retained on an end of the linkage portion 46 opposite the head portion 48 by a flange 62. The spring 60 may bias the pin 54 in the first end 56 of the elongated slot 52. The notch 36 may be defined by walls 64 that are arch-shaped and terminate at a bay wall 66 that may be a semi-circle shape. In some embodiments, the interface portion 32 has a circular cross-section for resting within the bay wall 66.

With reference now to FIGS. 4 and 5, the head portion 48 pivots relative to the linkage portion 46 between a receiving position (FIG. 4) associated with the unlocked position of the latch 30 and a retaining position (FIG. 5) associated with the locked position of the latch. In the receiving position, the notch 36 is aligned with the aperture 42 to receive the interface portion 32. More particularly, the walls 64 of the notch 36 are aligned to receive the interface portion 32. When the interface portion 32 contacts the walls 64 of the notch 36, the arch-shape of the walls 64 causes the head portion 48 to rotate by a first force ($F_1$). The rotation of the head portion 48, in turn, causes articulation around both the first pivot joint 34 and the second pivot joint 50. When the head portion 48 rotates relative to the linkage portion 46, a second force ($F_2$) is imparted between the pin 54 and the spring 60, compressing the spring 60 as the pin 54 travels (e.g., floats) towards the second end 58 of the elongated slot 52. After the head portion 48 rotates to a critical position (e.g., such that the linkage portion 46 is moved in a direction of the door 24), the spring 60 expands and pushes the pin 54 back towards the first end 56 of the elongated slot 52 and retains the head portion 48 in the retaining position. In the retaining position, the notch 36 is oriented at a transverse angle from the aperture 42 to retain the interface portion 32 in the locked position. More particularly, the walls 64 of the notch 36 are no longer aligned with the aperture 42 in the retaining position such that the head portion 48 is at least partially located between the interface portion 32 and the aperture 42.

With reference now to FIG. 5, when the head portion 48 is in the retaining position, the door 24 may be held closed by only the spring 60. In this manner, movement between the retaining position and the receiving position includes imparting a force that overcomes the spring 60. More particularly, when the door 24 is pulled to the open position, the interface portion 32 presses one of the walls 64 of the notch 36 (e.g., the portion of the head portion 48 between the interface portion 32 and the aperture 42) and the arch-shape of the walls 64 causes the head portion 48 to rotate by a third force ($F_3$). The rotation of the head portion 48, in turn, causes articulation around both the first pivot joint 34 and the second pivot joint 50. When the head portion 48 rotates relative to the linkage portion 46, a fourth force ($F_4$) is imparted between the pin 54 and the spring 60, compressing the spring 60 as the pin 54 travels (e.g., floats) towards the second end 58 of the elongated slot 52. After the head portion 48 rotates to a critical position (e.g., such that the linkage portion 46 is moved in a direction away from the door 24), the spring 60 expands and pushes the pin 54 back towards the first end 56 of the elongated slot 52 and retains the head portion 48 in the receiving position.

With reference now to FIGS. 3-5, a detent 68 may be coupled to the latch 30 proximate the first pivot joint 34 and pivots between a signal position and a release position. More particularly, the detent 68 may be coupled to the linkage portion 46 proximate to the first pivot joint 34 and moves with the linkage portion 46 as the head portion 48 is articulated between the receiving and retaining positions. The detent 68 is in the signal position when the head portion 48 is in the retaining position and the detent is in the release position when the head portion 48 is in the receiving position. An electric module 70 may be connected to the body 12 proximate the detent 68 and interfaces with the detent 68 in the signal position. The electric module 70 may be configured to transmit a signal to a control system of the washing appliance when the detent 68 is in the signal position to prevent the washer appliance 10 from operating a cleaning cycle when the latch 30 is in the unlocked position (e.g., when the head portion 48 is in the receiving position). In this manner, the washer appliance 10 may only operate when the locking assembly 26 is in the locked position and the door 24 is in the closed position. In some embodiments, the detent 68 is configured as a torsion spring such that it at least partially deforms against the electric module 70 in the signal position. More particularly, the detent 68 may extend from the linkage portion 46 proximate to the first pivot joint 34 and wrap around the first pivot joint 34 to a tail 71 that extends towards the electric module 70. In some embodiments, the tail 71 may be at least partially magnetized and the electric module 70 may include a sensor 73 (e.g., a magnetic sensor) that detects the presence of a magnetic field from tail 71. In some embodiments, the sensor 73 may be a mechanical-type sensor 73 that detects contact with the tail 71.

With continued reference to FIGS. 3-5, the striker 28 may include a base 72 with a first plate 74 and a second plate 76 that extends substantially perpendicular from the first plate 74. The catch 44 may define an L-shape that extends from the first plate 74 to the second plate 76. In some embodiments, the door 24 includes a back surface 78 (e.g., a surface facing the internal chamber 22) that defines a step 80 near an upper edge of the door 24. In some embodiments, the striker 28 is located on the step and the first plate 74 is connected to and extends along a surface of the step 80 in the vertical direction Y and the second plate 76 is connected to and extends along a surface of the step 80 that extends along the horizontal plane (e.g., the X and Z axes). In this manner, the portion of the catch 44 that is connected to the first plate 74 rigidly supports the interface portion 32 during repeated opening and closing of the door 24.

The invention disclosed herein is further summarized in the following paragraphs and is further characterized by combinations of any and all of the various aspects described therein.

According to one aspect of the present disclosure, a washer appliance includes a body that extends in a vertical direction between a top surface and a bottom surface and a front face that defines an opening into an internal chamber. A door is mounted to the body and is selectively moveable relative to the front face between an open position and a closed position. A locking assembly retains the door in the closed position. The locking assembly includes a striker and a latch. The striker is connected to the door and includes an interface portion that extends in the vertical direction. The latch is pivotally connected to the body proximate the front face at a first pivot joint and extends from the first pivot joint to a notch. The latch is moveable between a locked position where the interface portion is located in the notch and an unlocked position where the interface portion is located outside of the notch.

According to another aspect, a latch includes a linkage portion and a head portion with a notch that is located in a head portion.

According to yet another aspect, a linkage portion is pivotally connected to a head portion at a second pivot joint.

According to still yet another aspect, a linkage portion defines an elongated slot and a head portion defines a pin that is pivotal and slidable within the elongated slot.

According to another aspect, the elongated slot extends between a first end that is closest to a head portion and a second end that is furthest from the head portion.

According to yet another aspect, a spring is connected to a linkage portion and biases a pin in a first end of an elongated slot.

According to still yet another aspect, a spring is helically wound around a linkage portion and retained on an end of a linkage portion opposite a head portion by a flange.

According to another aspect, a notch is defined by walls that are arch-shaped and terminate at a bay wall that is a semi-circle shape.

According to yet another aspect, a detent is coupled to a latch proximate a first pivot joint and pivots between a signal position and a release position.

According to still yet another aspect, an electric module is connected to a body proximate a detent and interfaces with the detent in a signal position.

According to another aspect, an electric module is configured to transmit a signal to a control system of a washing appliance when a detent is in a signal position to prevent a washer appliance from operating a cleaning cycle when a latch is in an unlocked position.

According to another aspect of the present disclosure, a washer appliance includes a body that has a front face defining an opening into an internal chamber. An upper duct defines a top edge of the front face and the front face defines an aperture into the upper duct. A door is mounted to the body and is selectively moveable relative to the front face between an open position and a closed position. A locking assembly retains the door in the closed position. The locking assembly includes a striker and a latch. The striker is connected to the door and includes a catch defining an interface portion located in the aperture in the front face when the door is in the closed position. The latch is pivotally connected to the body within the upper duct at a first pivot joint and extends from the first pivot joint to a notch. The latch is moveable between a locked position where the interface portion is located in the notch and an unlocked position where the interface portion is located outside of the notch.

According to yet another aspect, a latch includes a linkage portion and a head portion that is pivotally connected to the linkage portion at a second pivot joint, and a notch is located in the head portion.

According to still yet another aspect, a linkage portion defines an elongated slot that extends between a first end that is closest to a head portion and a second end that is furthest from the head portion, and the head portion defines a pin that is pivotal and slidable within the elongated slot.

According to another aspect, a spring is helically wound around a linkage portion and biases a pin in a first end of an elongated slot.

According to yet another aspect, a head portion pivots relative to a linkage portion between a receiving position where a notch is aligned with an aperture to receive an interface portion and a retaining position where the notch is oriented at a transverse angle from the aperture to retain the interface portion in a locked position.

According to still yet another aspect, a striker includes a base with a first plate and a second plate that extends substantially perpendicular from the first plate, and a catch defines an L-shape that extends from the first plate to the second plate.

According to yet another aspect of the present disclosure, a dishwasher appliance includes a body extending in a vertical direction between a top surface and a bottom surface and a front face defines an opening into an internal chamber. A door is mounted to the body and is selectively moveable relative to the front face between an open position and a closed position. A locking assembly retains the door in the closed position. The locking assembly includes a striker and a latch. The striker is connected to the door and includes an interface portion extending in the vertical direction. The latch includes a linkage portion that is pivotally connected to the body proximate the front face at a first pivot joint and a head portion defines a notch and is pivotally connected to the linkage portion at a second pivot joint. The latch is moveable between a locked position where the interface portion is located in the notch and an unlocked position where the interface portion is located outside of the notch.

According to another aspect, a linkage portion defines an elongated slot and a head portion defines a pin that is pivotal and slidable within the elongated slot.

According to yet another aspect, a spring is helically wound around the linkage portion and biases the pin in the first end of the elongated slot.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A washer appliance comprising:
- a body extending in a vertical direction between a top surface and a bottom surface, a front face defines an opening into an internal chamber;
- a door mounted to the body and selectively moveable relative to the front face between an open position and a closed position; and
- a locking assembly for retaining the door in the closed position, the locking assembly comprising:
  - a striker connected to the door, the striker including an interface portion extending in the vertical direction; and
  - a latch pivotally connected to the body proximate the front face at a first pivot joint and extending from the first pivot joint to a notch, the latch is moveable between a locked position where the interface portion is located in the notch and an unlocked position where the interface portion is located outside of the notch.

2. The washer appliance of claim 1, wherein the latch includes a linkage portion and a head portion, and the notch is located in the head portion.

3. The washer appliance of claim 2, wherein the linkage portion is pivotally connected to the head portion at a second pivot joint.

4. The washer appliance of claim 3, wherein the linkage portion defines an elongated slot and the head portion defines a pin that is pivotal and slidable within the elongated slot.

5. The washer appliance of claim 4, wherein the elongated slot extends between a first end that is closest to the head portion and a second end that is furthest from the head portion.

6. The washer appliance of claim 5, wherein a spring is connected to the linkage portion and biases the pin in the first end of the elongated slot.

7. The washer appliance of claim 6, wherein the spring is helically wound around the linkage portion and retained on an end of the linkage portion opposite the head portion by a flange.

8. The washer appliance of claim 1, wherein the notch is defined by walls that are arch-shaped and terminate at a bay wall that is a semi-circle shape.

9. The washer appliance of claim 1, wherein a detent is coupled to the latch proximate the first pivot joint and pivots between a signal position and a release position.

10. The washer appliance of claim 9, wherein an electric module is connected to the body proximate the detent and interfaces with the detent in the signal position.

11. The washer appliance of claim 10, wherein the electric module is configured to transmit a signal to a control system of the washing appliance when the detent is in the signal position to prevent the washer appliance from operating a cleaning cycle when the latch is in the unlocked position.

12. A washer appliance comprising:
- a body that includes a front face defining an opening into an internal chamber;
- an upper duct defining a top edge of the front face, the front face defining an aperture into the upper duct;
- a door mounted to the body and selectively moveable relative to the front face between an open position and a closed position; and a locking assembly for retaining the door in the closed position, the locking assembly comprising:

a striker connected to the door, the striker including a catch defining an interface portion located in the aperture in the front face when the door is in the closed position; and a latch pivotally connected to the body within the upper duct at a first pivot joint and extending from the first pivot joint to a notch, the latch is moveable between a locked position where the interface portion is located in the notch and an unlocked position where the interface portion is located outside of the notch.

13. The washer appliance of claim 12, wherein the latch includes a linkage portion and a head portion that is pivotally connected to the linkage portion at a second pivot joint, the notch is located in the head portion.

14. The washer appliance of claim 13, wherein the linkage portion defines an elongated slot that extends between a first end that is closest to the head portion and a second end that is furthest from the head portion, and the head portion defines a pin that is pivotal and slidable within the elongated slot.

15. The washer appliance of claim 14, wherein a spring is helically wound around the linkage portion and biases the pin in the first end of the elongated slot.

16. The washer appliance of claim 15, wherein the head portion pivots relative to the linkage portion between a receiving position where the notch is aligned with the aperture to receive the interface portion and a retaining position where the notch is oriented at a transverse angle from the aperture to retain the interface portion in the locked position.

17. The washer appliance of claim 16, wherein the striker includes a base with a first plate and a second plate that extends substantially perpendicular from the first plate, the catch defining an L-shape that extends from the first plate to the second plate.

18. A dishwasher appliance comprising:

a body extending in a vertical direction between a top surface and a bottom surface, a front face defines an opening into an internal chamber;

a door mounted to the body and selectively moveable relative to the front face between an open position and a closed position; and a locking assembly for retaining the door in the closed position, the locking assembly comprising:

a striker connected to the door, the striker including an interface portion extending in the vertical direction; and a latch including a linkage portion that is pivotally connected to the body proximate the front face at a first pivot joint and a head portion defines a notch and is pivotally connected to the linkage portion at a second pivot joint, and the latch is moveable between a locked position where the interface portion is located in the notch and an unlocked position where the interface portion is located outside of the notch.

19. The dishwasher appliance of claim 18, wherein the linkage portion defines an elongated slot and the head portion defines a pin that is pivotal and slidable within the elongated slot.

20. The dishwasher appliance of claim 18, wherein a spring is helically wound around the linkage portion and biases the pin in the first end of the elongated slot.

* * * * *